United States Patent [19]

Higginbotham et al.

[11] 3,794,454
[45] Feb. 26, 1974

[54] APPARATUS FOR AUTOMATICALLY TRIM FINISHING BLOW MOLDED PLASTIC ARTICLES

[75] Inventors: Lloyd D. Higginbotham, Williamston; Lars U. Graff, Okemos; William A. Scott, Chelsea, all of Mich.

[73] Assignee: Haskon Incorporated, Wilmington, Del.

[22] Filed: July 31, 1972

[21] Appl. No.: 276,461

[52] U.S. Cl. 425/387 B, 425/DIG. 211, 425/302 B, 425/455
[51] Int. Cl. ............................................ B29d 23/03
[58] Field of Search.........425/DIG. 203, 211, 212, 425/DIG. 213, 302 B, 302, 387 B, 455; 214/1 BB

[56] References Cited
UNITED STATES PATENTS
3,479,690  11/1969  Hagen........................ 425/DIG. 211
FOREIGN PATENTS OR APPLICATIONS
869,004  4/1971  Canada....................... 425/DIG. 213

Primary Examiner—Richard B. Lazarus
Attorney, Agent, or Firm—Finnegan, Henderson, Farabow & Garrett

[57] ABSTRACT

A method and apparatus for initially blow-molding a plurality of hollow plastic articles and thereafter trimming the articles so that the top walls and tails formed in the blow molding operation are removed. The trim apparatus includes a set of transfer supports positioned below the molds at a mold station to receive the articles discharged from the molds. The articles are moved by the transfer supports horizontally in a direction parallel to the vertical plane of the tails in a first path from the mold station to a gripping station. The transfer supports release the articles at the gripping station and are returned to the mold station for receiving a second set of molded articles. A set of gripping supports positively grip the molded articles delivered to the gripping station by the transfer supports upon return of the transfer supports to the mold station. The gripping supports are movable in a second path from the gripping station to a conveying station. Cutting means are positioned in the second path for removing the excess top walls and tails of the molded articles as they move from the gripping station to the conveying station.

16 Claims, 8 Drawing Figures

APPARATUS FOR AUTOMATICALLY TRIM FINISHING BLOW MOLDED PLASTIC ARTICLES

This invention relates generally to a method and apparatus for automatically forming plastic containers, and more particularly to an improved method and apparatus for automatically trim finishing blow molded plastic articles.

Blow molded plastic articles direct from a blow molding machine are usually encumbered with excess unwanted plastic material which must be removed in order to finish the article. For example, one type of blow molding machine includes a die head which is capable of extruding a downwardly extending tubular parison which is open at its lower end.

Horizontally movable mold sections disposed below the die head move into engaged positions in which they pinch the lower end of the parison to close it and form a mold cavity around the parison, following which the parison is blown into conformity with the mold cavity. When the plastic cools, the portion of the parison which was pinched together by the mold sections forms a tail which is integral with and depends from the bottom of the article. In order to properly form the upper end of the article, which is subsequently stripped or cut from the heated plastic remaining in the die head, it is usually necessary to design the mold so that the upper end of the article is provided with excess plastic. In finish trimming such an article, it is necessary to remove the tail and also remove the excess material at the upper end of the article.

In the past, a variety of mechanisms have been used to remove excess plastic material from molded articles. In one type of mechanism tails and excess top material are removed simultaneously by a cutting unit. In this mechanism, the molded articles are not positively and individually gripped and are pushed through the cutting unit in contact with each other by a single pushing force acting on a plurality of articles. The molded articles can easily jam as they move to and through the cutting unit. Other prior art mechanisms have separately removed the tails and excess top material. A continuing search goes on for improved trim finishing apparatus.

Accordingly, it is a primary object of this invention to provide an improved method and apparatus for trim finishing blow molded articles.

Another object of this invention is to provide a trim finishing apparatus which simultaneously removes the tail and excess top material from a molded article.

A further object of this invention is to provide a trim finishing apparatus in which the molded articles are positively and individually gripped as they move through a cutting unit.

It is a further object of this invention to provide a trim finishing apparatus which requires a minimum floor space adjacent the blow molding machine.

A still further object of this invention is to provide automatic trim finishing apparatus which can be used with a variety of differently sized and shaped bottles and which moves the blown articles in a direction away from the die head, so that they will not interfere with subsequently formed downwardly moving articles and will avoid delays in the operation of the machine.

To achieve the foregoing objects, and in accordance with its purpose as embodied and broadly described, this invention provides trim apparatus for use with a blow molding machine having a row of molds which comprises: a set of transfer supports corresponding in number to the number of molds in the row for receiving molded articles from the molds, the transfer supports being positioned below the molds and movable in a first path from a mold station where the transfer supports are in vertical alignment with the row of molds to a gripping station; a set of gripping supports corresponding in number to the number of molds in the row for positively gripping molded articles delivered to the gripping station by the transfer supports and being movable in a second path from the gripping station to a conveying station; cutting means positioned in the second path for cutting excess material from molded articles as they move from the gripping station to the conveying station; means for moving the transfer supports from the mold station to the gripping station and for moving the gripping supports from the gripping station to the conveying station, and for returning the transfer supports from the gripping station to the mold station and for returning the gripping supports from the conveying station to the gripping station; means for moving the transfer supports to release molded articles at the gripping station and for moving the transfer supports to vertical alignment with the molds at the mold station; and means for moving the gripping supports to release molded articles at the conveying station and for moving the gripping supports to grip the molded articles delivered to the gripping station by the transfer supports.

Once the excess material is cut off, the molded articles are readily moved from the conveying station onto a conveyor or the like which takes the final trimmed articles to a filling or packaging station.

It is to be understood that both the foregoing general description and the following detailed description are exemplary and explanatory, but are not restrictive of the invention.

The accompanying drawings illustrate an example of a preferred embodiment of the invention and, together with the description, serve to explain the principles of the invention.

Figure 1:
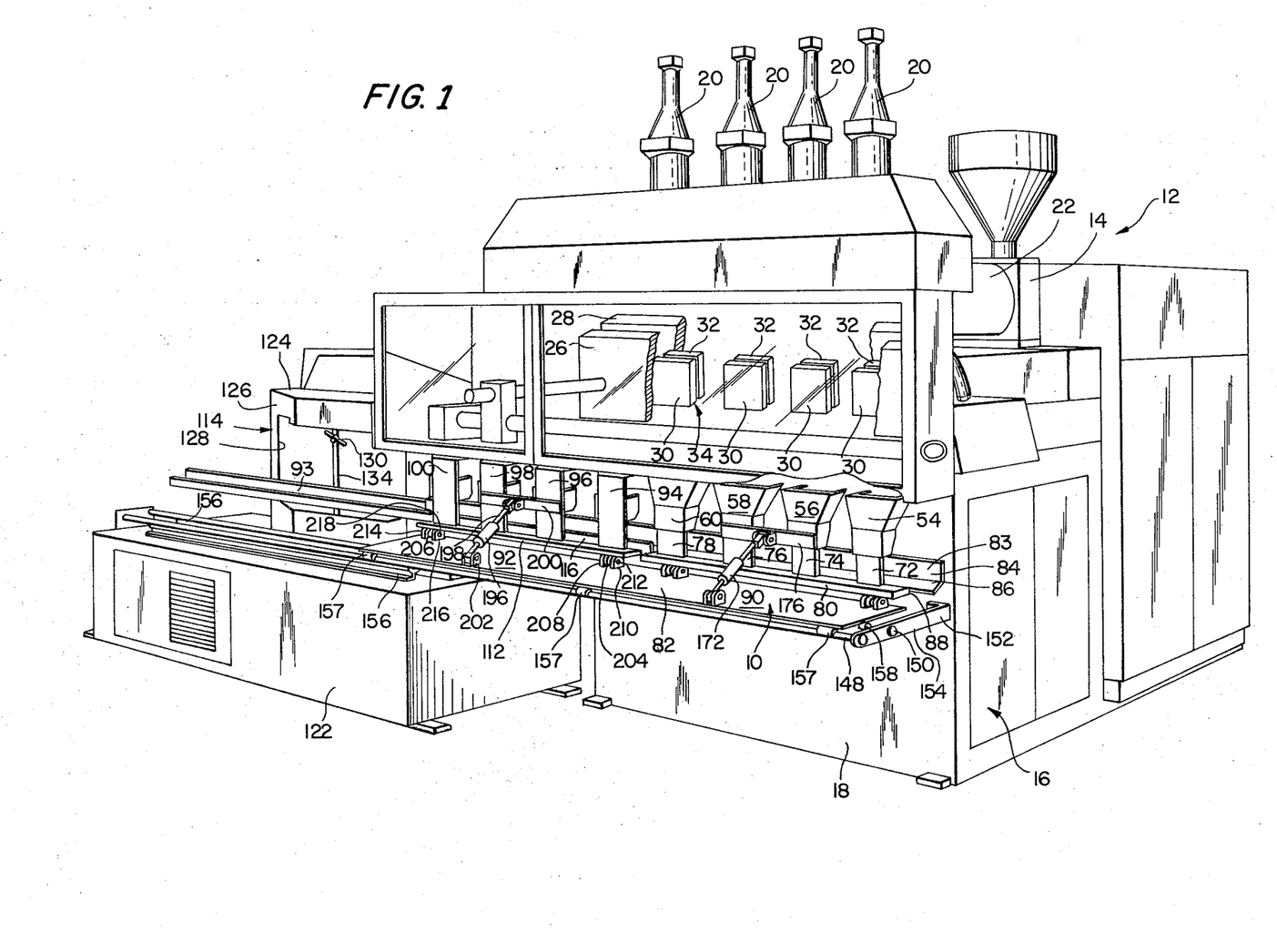
FIG. 1 is a perspective view of a trim apparatus constructed in accordance with the teachings of this invention in assembled relation with a blow molding and shows the transfer supports positioned at a mold station for receiving molded articles from the blow molding machine and the gripping supports positioned at a gripping station.
Figure 5:
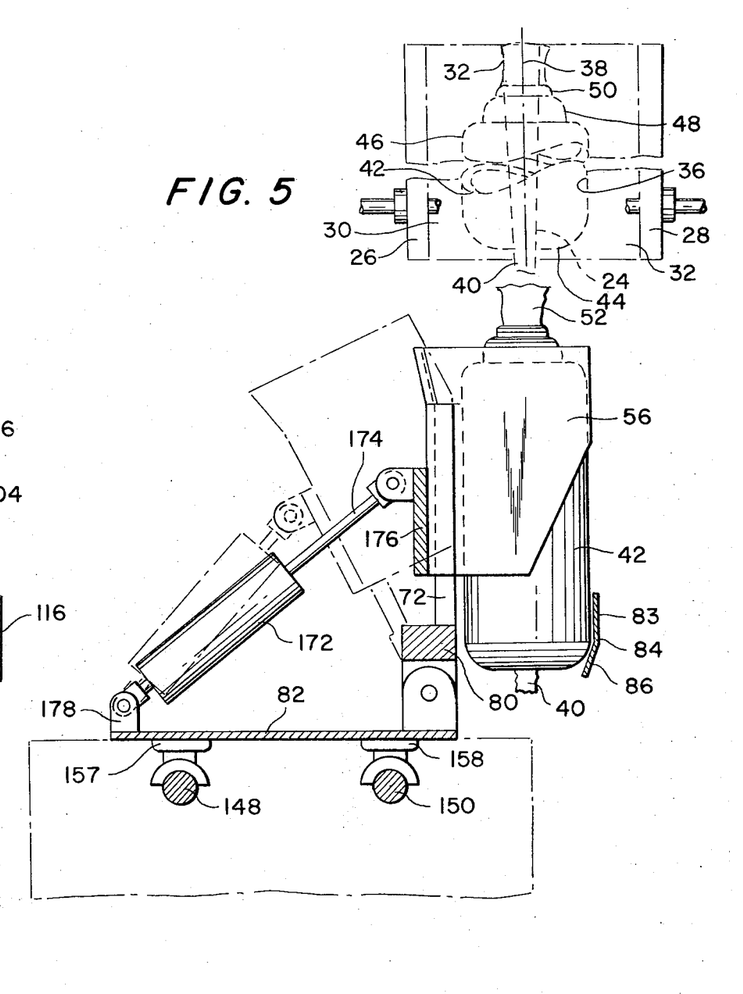
FIG. 5 is a side elevation view showing in full line a transfer support in vertical alignment with a mold, and showing in phantom line the transfer support in a released position.

With reference to the drawings, the trim apparatus of this invention indicated generally at 10, is illustrated in FIG. 1 in assembly relation with a blow molding machine 12. Blow molding machine 12 includes a main frame 14 and a housing generally 16, having a front wall 18. A plurality of vertical die heads 20, here shown as four in number, are supplied with plastic in a heated semi-fluid condition by an extruder 22 so that each die head is capable of forming a downwardly extending parison 24 (FIG. 5) the lower end of which is originally open. As best seen in FIGS. 1 and 5, a pair of mold carrying platens 26 and 28 are slidably mounted on main frame 14 at a position below die heads 20. Platen 26 carries four mold sections 30 and platen 28 carries four mold sections 32 aligned with mold sections 30. Platens 26 and 28 are movable horizontally toward each other to bring mold sections 30 and 32 into engaged positions in which they form a row of molds 34 with each mold in the row having a cavity 36. Molds 34 correspond in number to and are disposable in a centered relation with and below die heads 20. As seen in FIG. 5, the parting line of each mold cavity 36 formed by the mold sections 30 and 32 is disposed in a vertical plane 38 which is parallel to front wall 18 of housing 16.

In operation of machine 12, when mold sections 30 and 32 are moved horizontally toward each other into engagement as shown in FIG. 5, they pinch the lower end portion 40 of each parison 24 and air under pressure is subsequently discharged into the closed parison 24 from a discharge nozzle to expand parison 24 into conformity with mold cavity 36 and form a plastic article indicated at 42 in FIG. 5. The top of article 42 is cut from the heated plastic remaining in die head 20 and mold sections 30 and 32 are subsequently moved apart at a discharge station in the conventional operation of machine 12 whereupon molded articles 42 fall downwardly.

In the present embodiment of the invention, closed molds 34 are moved horizontally in plane 38 to a discharge station remote from die heads 20 to enable continuous extrusion of parison 24 and are returned to vertical alignment with die heads 20 in an open position after molded articles 42 have been discharged at the discharge station. Upon return to vertical alignment with die heads 20, the molds are in position to immediately close on a new length of parison 24 which has been extruded during the discharge operation. Plastic is continuous and concurrently extruded from all four die heads 20 so that in the illustrated embodiment of the invention four articles 42 are formed each time mold sections 30 and 32 are moved apart.

It is to be understood, however, that the blow molding machine used in conjunction with the trim apparatus of the present invention can be of the type where parison extrusion is intermittent and the closed mold sections are not moved from beneath die heads 20 to a discharge station, but are opened immediately beneath the die heads. In this type of blow molding machine, parison extrusion is stopped during the period when the mold sections are closed.

As shown in FIG. 5 mold cavity 36 for each mold 34 is of a shape such that each article 42 has a bottom wall 44, a cylindrical side wall 46 which extends upwardly from bottom wall 44, and a top wall 48 having a narrow neck 50. Excess material 52 extends upwardly from neck 50 of top wall 48 and the pinched portion 40 of the parison 24 forms a tail on bottom wall 44 of the article 42.

In accordance with the invention, a set of transfer supports corresponding in number to the number of molds in the row are provided for receiving molded articles from the molds. The transfer supports are positioned below the molds and are movable in a first path from a mold station where the transfer supports are in vertical alignment with the row of molds to a gripping station.

Figure 2:
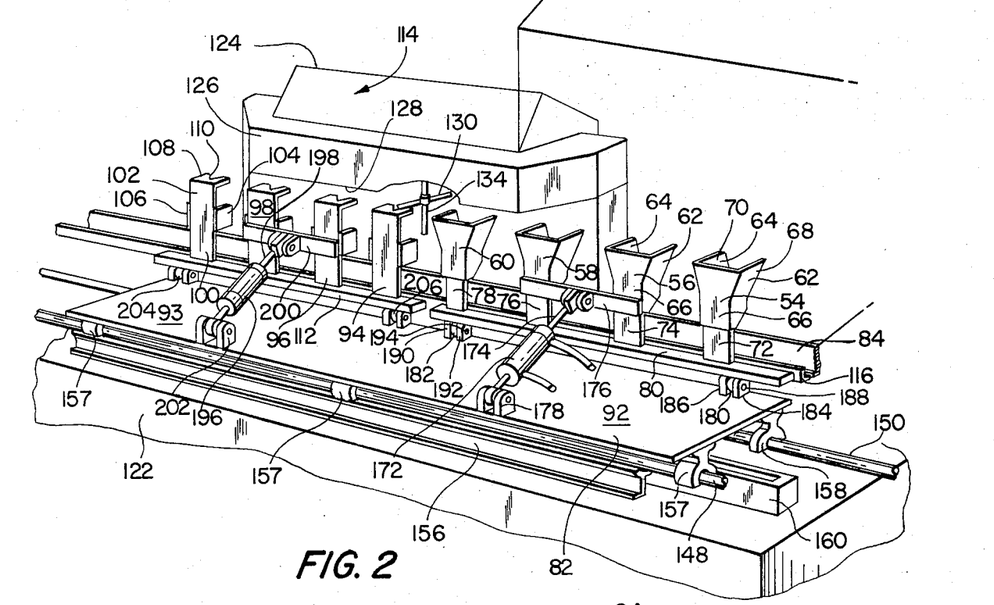
FIG. 2 is a partial perspective view of the apparatus shown in FIG. 1, but shows the transfer supports positioned at the gripping station and the gripping supports positioned at a conveying station.
Figure 3:
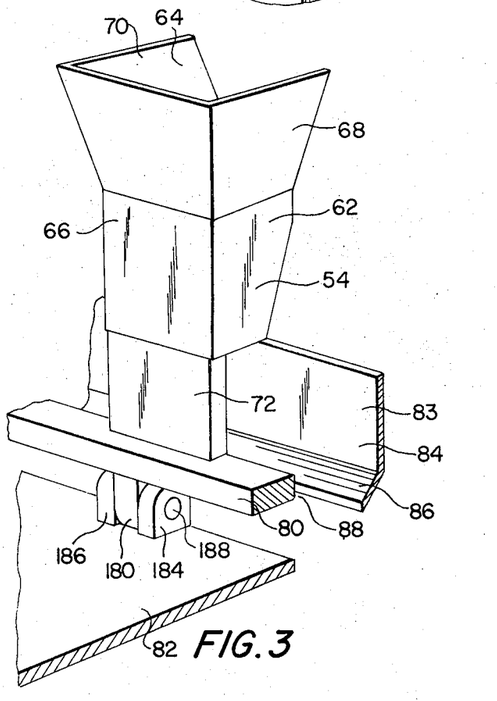
FIG. 3 is a perspective view of a single transfer support constructed in accordance with this invention.

As here embodied, and as best seen in FIG. 1, four identical transfer supports 54, 56, 58 and 60 are provided for receiving molded articles 42 as they fall from open mold sections 30 and 32. As best seen in FIGS. 2 and 3, each transfer support is open at its top and front, and includes a pair of opposing side walls 62 and 64 and a back wall 66. Side walls 62 and 64 have top sections 68 and 70 respectively, which diverge from each other so that the transfer supports are wider at their top than at their bottom and have a funnel-like opening at their top. Four vertically extending support plates 72, 74, 76 and 78 are aligned in a plane parallel to plane 38 and are secured to side walls 62 and 64 of transfer supports 54, 56, 58 and 60 respectively. Support plates 72, 74, 76 and 78 are secured at their bottom to a horizontally extending first support bar 80 which is pivotally mounted on a movable carriage 82 as explained in greater detail hereafter.

A horizontally extending article guide rail 84 is secured to front wall 18 of housing 16. Guide rail 84 includes a vertical wall 83 secured to front wall 18 and a projecting lower shelf 86 which is spaced from and cooperates with support bar 80 to form an opening 88 for receiving tail 40 of molded articles 42. Shelf 86 forms an obtuse angle with wall 83 for guiding molded articles 42 into opening 88 as they fall from opened molds 34 and to insure that tails 40 do not catch in guide rail 82 as the articles fall from the molds.

Transfer supports 54, 56, 58 and 60 are movable in a first horizontal path parallel to plane 38 from a mold station 90 at the right side of blow molding machine 12 as viewed in FIG. 1 to a gripping station 92 which is removed from mold station 90 and is at the left side of machine 12. At mold station 90, transfer supports 54, 56, 58 and 60 are in vertical alignment with molds 34 which are at their discharge station.

In accordance with the invention, a set of gripping supports corresponding in number to the number of molds in the row is provided for positively gripping molded articles delivered to the gripping station by the transfer supports. The gripping supports are movable in a second path from the gripping station to a conveying station.

As here embodied, four gripping supports 94, 96, 98 and 100 are horizontally aligned with transfer supports 54, 56, 58 and 60 in a plane parallel to plane 38.

Figure 4:
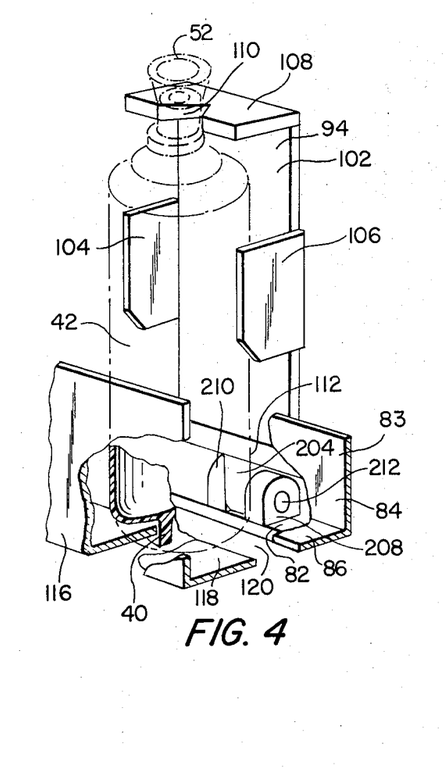
FIG. 4 is a perspective view of a single gripping support constructed in accordance with this invention and shows a molded article being gripped by the gripping support.

As best seen in FIGS. 3 and 4, each gripping support includes a back plate 102, two opposing side plates 104 and 106, and a top plate 108. Side plates 104 and 106 are positioned at a height where they grip molded articles 42 at their widest portion. Top plate 108 has a V-shaped opening 110 sized to grip narrow neck 50 of molded articles 42. Back plate 102 of each gripping support are secured to a second horizontally extending support bar 112 which is pivotally mounted on carriage 82 and aligned with first support bar 80.

Gripping supports 94, 96, 98 and 100 are movable in a second horizontal path parallel to plane 38 from gripping station 92 to a conveying station 93 which is located as viewed in FIG. 1, to the left of and beyond blow molding machine 12 at a cutting unit 114 described in greater detail hereafter. Guide rail 84 extends from mold station 90 past gripping station 92 to conveying station 93. At gripping station 92, guide rail 84 becomes L-shaped with shelf 86 forming a right angle with wall 83. An opposing spaced apart second L-shaped guide rail 116 begins at gripping station 92 and extends to conveying station 93. Guide rail 116 is mounted on cutting unit 114 and has a lower shelf 118 which forms a narrow opening 120 with shelf 86 of guide rail 84 to receive tails 40 and guide molded articles 42 through gripping station 92, and conveying station 93. Gripping supports 94, 96, 98 and 100 cooperate with guide rails 84 and 114 to firmly grip molded articles.

In accordance with the invention cutting means are positioned in the second path of movement of the gripping supports for cutting excess material from molded articles as they move from the gripping station to the conveying station.

Figure 7:
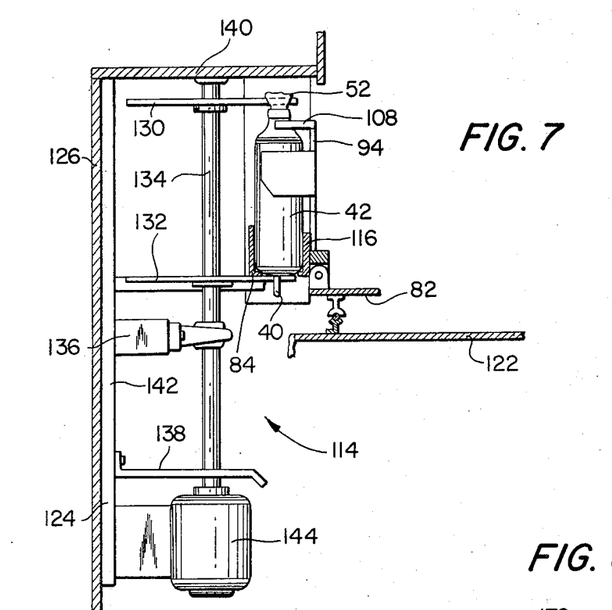
FIG. 7 is a partial side elevation view showing a cutting unit of the trim apparatus of FIG. 1.

As here embodied, and as best seen in FIGS. 1, 2 and 7, this cutting means is a cutting unit, generally 114, which is located adjacent the left side of blow molding machine 12. Cutting unit 114 includes a base section 122 and an upstanding cutting section 124 having a housing 126 with a front opening 128. A top rotary detabber generally 130 is mounted in cutting section 124 for removing excess material from the top of molded articles 42 and a bottom rotary detabber, generally 132 is mounted in cutting section 124 for removing tail sections 40 from the molded articles. Top detabber 130 comprises a rotary detabbing blade secured at its center to a rotary shaft 134. A center bracket 136, and a lower bracket 138 are secured to a back wall 142 of housing 126, and shaft 134 is journaled for rotation in these brackets and in top wall 140 of housing 126. Rotary shaft 134 is driven by a motor 144 secured to back wall 142 below lower support bracket 138. Top detabber 130 is positioned in housing 126 so that its rotary path of movement intercepts the excess top material 52 of articles 42 as the articles move to conveying station 93. Excess top material 52 is attached to molded article 42 by a thin score line of plastic material, and the impact of detabber 130 contacting excess top material 52 breaks this score line and separates the molded article and excess top material.

Detabber 132 comprises a rectangular detabbing blade secured at its center to rotary shaft 134. Detabber 132 is positioned immediately below the bottom surface of guide rails 84 and 116 and its rotary path of movement intercepts tail 40 of molded articles 42 as the articles move to conveying station 93, to break the thin score line that joins tails 40 to the bottom of the molded articles. Cutting of tails 40 and excess top material 52 is thus performed substantially simultaneously.

In accordance with the invention, means are provided for moving the transfer supports from the mold station to the gripping station and for moving the gripping supports from the gripping station to the conveying station, and for returning the transfer supports from the gripping station to the mold station and for returning the gripping supports from the conveying station to the gripping station.

Figure 8:
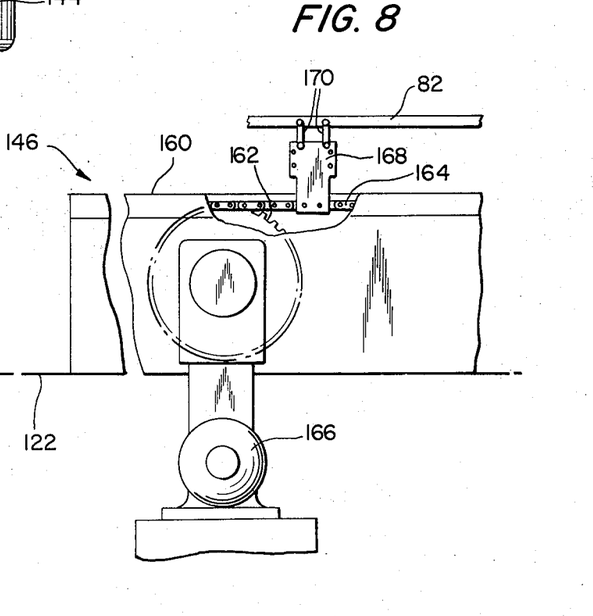
FIG. 8 is a side elevation view of a drive mechanism for moving the transfer supports and gripping supports between the mold, gripping and conveying stations.

As here embodied, this means comprises carriage 82 on which transfer supports 52, 54, 56 and 58 and gripping supports 94, 96, 98 and 100 are mounted and a dirve means generally 146, best seen in FIG. 8, which drives carriage 82 in either one of two opposite directions. As best seen in FIGS. 1 and 2, carriage 82 is slidably mounted on two spaced apart guide rods 148 and 150. An L-shaped bracket, generally 152, is secured to front wall 18 of housing 16 below guide rail 84 and has a horizontally extending arm 154. Guide rods 148 and 150 are secured to arm 154 at one of their ends and rest on blocks 156 mounted on top of base section 122 of cutting unit 114 at their other end. A first set of three sleeves 157 depends from the bottom surface of carriage 82, and these sleeves are slidably mounted on guide rod 148. A second set of three spaced apart sleeves 158 depends from carriage 82 and are slidably mounted on guide rod 150.

Drive means 146 includes a drive track 160 mounted on base section 122 between guide rods 140 and 150 and below carriage 82; a sprocket gear 162 mounted at one end of track 160; an endless chain 164; a motor 166; and a dog 168. Drive chain 164 meshes with sprocket gear 162 and extends about drive track 160. Sprocket gear 162 is rotated in a clockwise or counterclockwise direction by drive motor 166 which is mounted in base section 122. Dog 168 is secured to drive chain 164 and engages a coupler 170 which depends from carriage 82. Rotation of drive gear 162 by motor 166 drives chain 164 over track 160 and causes dog 168 to move in a linear path. Movement of dog 168 causes a corresponding movement of carriage 82 in a linear path on guide rods 148 and 150, and in turn causes a simultaneous movement of transfer supports 52, 54, 56 and 58 and gripping supports 94, 96, 98 and 100 in the same direction. Motor 166 is reversible and can drive carriage 82 from mold station 90 toward conveying station 93 and in a reverse direction from conveying station 93 toward mold station 90.

In accordance with the invention, means are provided for moving the transfer supports to release molded articles at the gripping station and for moving the transfer supports to vertical alignment with the molds at the mold station. As here embodied, (FIGS. 1, 2) this means comprises a first hydraulic cylinder 172 mounted on carriage 82 and connected to transfer supports 54, 56, 58 and 60 for controlling the movement of the transfer supports between an operative position and a release. Hydraulic cylinder 172 has a piston rod 174 which is connected at its top to the center of coupling bar 176 that joins transfer support 56 to transfer support 58. A block 178 is secured to the upper surface of carriage 82 between transfer supports 56 and 58, and the lower end of hydraulic cylinder 172 is secured to block 178. A first depending flange 180 (FIG. 2) extends downwardly from the bottom surface of support bar 80 at one end of the bar and a second descending flange 182 extends downwardly from the bottom surface at the other end of the support bar. Flange 180 is mounted between two aligned spaced apart flange mounts 184 and 186 which extend upwardly from carriage 82 adjacent transfer support 54. A rod 188 is supported in openings in flange mounts 184 and 186, and flange 180 is rotatably mounted about rod 188. Similarly, flange 182 is mounted between two aligned spaced apart flange mounts 190 and 192 which extend upwardly from carriage 82 adjacent transfer support 60. A rod 194 is supported in aligned openings in flange mounts 190 and 192 and flange 182 is rotatably mounted about rod 194. Support bar 80 is thus pivotally mounted on carriage 82 and can be pivotally moved by hydraulic cylinder 172 about rods 188 and 194 and thereby moves transfer supports 54, 56, 58 and 60 between a vertical operating position and an inclined release position as shown in FIG. 5.

In accordance with the invention, means are provided for moving the gripping supports to release molded articles at the conveying station and for moving the gripping supports to grip molded articles delivered to the gripping station by the transfer supports. As here embodied (FIGS. 1, 2), this means comprises a second hydraulic cylinder 196 mounted on carriage 82 and connected to gripping supports 94, 96, 98 and 100 for controlling the movement of the gripping supports between an operative position and a release position. Hydraulic cylinder 196 has a piston rod 198 which is connected at its top to the center of a coupling bar 200 that joins gripping support 96 to gripping support 98. A block 202 is secured to the upper surface of carriage 82 between gripping supports 96 and 98, and the lower end of hydraulic cylinder 196 is secured to block 202.

Figure 6:
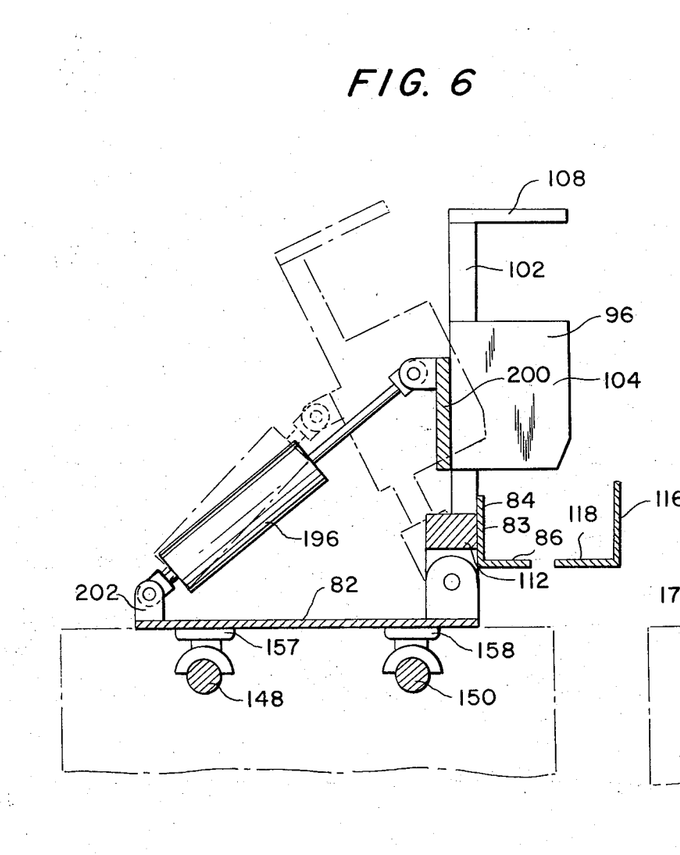
FIG. 6 is a side elevation view showing in full line a gripping support in a gripping position, and showing in phantom line the gripping support in a released position.

First and second depending flanges 204 and 206 respectively (FIG. 1), extend downwardly from the bottom surface of support bar 112 at opposite ends of the support bar. Flange 204 is mounted between two aligned spaced apart flange mounts 208 and 210 which extend upwardly from carriage 82 adjacent gripping support 94. A rod 212 is supported in aligned openings in flange mounts 208 and 210, and flange 204 is rotatably mounted about rod 212. Similarly, flange 206 is mounted between two aligned spaced apart flange mounts 214 and 216 which extend upwardly from carriage 82 adjacent gripping support 100. A rod 218 is supported in aligned openings in flange mounts 214 and 216, and flange 206 is rotatably mounted about rod 218. Support bar 112 is thus pivotally mounted on carriage 82 and can be pivotally moved by hydraulic cylinder 196 about rods 212 and 218 to thereby move gripping supports 94, 96, 98 and 100 between a vertical operating position and an inclined release position as shown in FIG. 6.

In operation, the transfer and gripping supports are operated through a four stroke cycle, including (1) an advance stroke, (2) a clearing or release stroke, (3) a return stroke and (4) an operating stroke. Initially, transfer supports 54, 56, 58 and 60 are at mold station 90 in vertical alignment with molds 34 to receive a first set of molded articles 42 that is to be discharged from the molds. At this time, gripping supports 94, 96, 98 and 100 are in vertical position at gripping station 92. Molds 34 are opened and the first set of articles 42 fall by gravity into transfer supports 54, 56, 58 and 60 under guidance of guide rail 84. Tails 40 of articles 42 fall into opening 88. The advance stroke begins and motor 166 is actuated to move carriage 82 from the right to left, as viewed on FIG. 1, and thereby move the transfer supports 54, 56, 58, and 60 from mold station 90 to gripping station 92 and gripping supports 94, 96, 98 and 100 from gripping station 92 to conveying station 93. As molded articles 42 move into gripping station 92 from mold station 90, their tails 40 move into narrow opening 120 formed by first and second guide rails 84 and 112. Motor 166 is then deactivated, and hydraulic cylinders 172 and 196 are activated to begin the release stroke and simultaneously move the transfer and gripping supports from their vertical position to their inclined release position. Molded articles 42 remain standing at gripping station 92 when transfer supports 54, 56, 58 and 60 are moved to their release position.

The return stroke now begins and motor 166 is activated in a reverse direction to move carriage 82 from the left to the right and thereby move transfer supports 54, 56, 58 and 60 in their release position from gripping station 92 to mold station 90 and to move gripping supports 94, 96, 98 and 100 in their release position from conveying station 93 to gripping station 92. Motor 166 is again deactivated and the operating stroke begins in which hydraulic cylinders 172 and 196 are simultaneously activated to simultaneously return the transfer supports to their vertical operating position at mold station 90 and to return the gripping supports to their vertical operating position at gripping station 92. As gripping supports 94, 96, 98 and 100 are returned to vertical position at gripping station 92, they engage and positively grip the first set of molded articles 42 that was delivered there by transfer supports 54, 56, 58 and 60.

As soon as transfer supports 54, 56, 58 and 60 return to their vertical operating position, they are in position to receive a second set of molded articles 42 that has been formed in molds 34 during the movement of the transfer supports through their four stroke cycle and a new cycle begins. Motor 166 is again actuated to move carriage 82 from the right to the left of blow molding machine 12. During this movement gripping supports 94, 96, 98 and 100 move the first set of molded articles 42 from gripping station 92 to conveying station 93 and transfer supports 54, 56, 58 and 60 move the second set of molded articles to gripping station 92. As the first set of molded articles moves to conveying station 93, they pass cutting section 124 where detabbers 130 and 132 remove top excess material 52 and tails 40 from this set of articles. During this removal of waste material, the molded articles are firmly gripped by gripping supports 94, 96, 98 and 100. Top plates 108 of the gripping supports firmly engage necks 50 of articles 42 and prevent the tops of the articles from moving when detabber 130 strikes excess material 52 from them. Similarly, side plates 104 and 106 of the gripping supports firmly engage the lower portion of articles 42 at their widest part, and prevent the articles from moving when detabber 132 strikes tails 40 from the articles. When the first set of molded articles reaches conveying station 93, hydraulic cylinders 172 and 196 are activated to move the gripping and transfer supports to their release position and thereby release the first and second sets of molded articles. This cycle is then completed by returning carriage 82 to mold station 90 and raising the gripping and transfer supports to vertical position.

During the next cycle, when the gripping supports move from gripping station 92 to conveying station 93, side plate 108 of lead gripping support 100 contacts the first set of molded articles left at conveying station 93 and moves them toward a new station where the now finished first set of articles can be filled.

Conventional control and timing means are provided for automatically operating hydraulic cylinders 172 and 196 and motor 166 of trim apparatus 10 in proper sequence.

Trim apparatus 10 operates in a timed relation with blow molding machine 12 so that by the time the transfer supports have completed their cycle, blow molding machine 12 has completed a cycle and is in position to deliver four more articles 42 to the transfer supports. It can thus be seen that trim apparatus 10 operates in conjunction with the machine 12 to take articles 42 which have been formed to a predetermined shape in the machine 12 and automatically trim and finish the articles 42 so as to form containers of the desired final shape. Trim apparatus 12 operates automatically to shear off tails 40 and remove excess material 52 from the tops of the articles 42.

The invention in its broader aspects is not limited to the specific details shown and described and departures may be made from such details without departing from the principles of the invention and without sacrificing its chief advantages.

What is claimed is:

1. A trim apparatus for use with a blow molding machine having a row of molds which form plastic articles having excess material, comprising:
   a. a set of transfer supports corresponding in number to the number of molds in the row for receiving molded articles from the molds, said transfer supports being positioned below the molds and movable in a first path from a mold station where the transfer supports are in vertical alignment with the row of molds to a gripping station;
   b. a set of gripping supports corresponding in number to the number of molds in the row for positively gripping molded articles delivered to said gripping station by said transfer supports and being movable in a second path from the gripping station to a conveying station;
   c. cutting means positioned in said second path for cutting excess material from molded articles as they move from said gripping station to said conveying station;
   d. means for moving said transfer supports from said mold station to said gripping station and for moving said gripping supports from said gripping station to said conveying station, and for returning said transfer supports from said gripping station to said mold station and for returning said gripping supports from said conveying station to said gripping station;
   e. means for moving said transfer supports to release molded articles at said gripping station and for moving the transfer supports to vertical alignment with the molds at the mold station; and
   f. means for moving said gripping supports to release molded articles at the conveying station and for moving said gripping supports to grip said molded articles delivered to said gripping station by said transfer supports.

2. The apparatus of claim 1 wherein said means for moving the transfer supports from the mold station to the gripping station comprises a slidable carriage on which the transfer and gripping supports are mounted and a drive means for moving the slidable carriage.

3. The apparatus of claim 2 wherein said means for moving said transfer supports to release molded articles at said gripping station is mounted on said slidable carriage.

4. The apparatus of claim 3 wherein said transfer supports are mounted on a support bar mounted on said carriage.

5. The apparatus of claim 4 wherein said support bar is pivotally mounted on said carriage for pivotal movement of said transfer supports.

6. The apparatus of claim 2 wherein said means for moving the gripping supports to release molded articles at the conveying station is mounted on said slidable carriage.

7. The apparatus of claim 6 wherein said gripping supports are mounted on a support bar mounted on said carriage.

8. The apparatus of claim 7 wherein said support bar is pivotally mounted on said carriage for pivotal movement of said gripping supports.

9. The apparatus of claim 2 wherein said means for moving said transfer supports to release molded articles at the gripping station and said means for moving the gripping supports to release molded articles at the conveying station are mounted on said carriage.

10. The apparatus of claim 2 wherein said transfer supports and said gripping supports are pivotally mounted on said slidable carriage.

11. The apparatus of claim 1 wherein each of said gripping supports comprises a back plate, two opposing side plates, and a top plate having a notch for engaging the top of a molded article.

12. The apparatus of claim 1 including a first guide rail extending from said mold station to said conveying station and cooperating with said transfer supports for receiving molded articles from a blow molding machine and cooperating with said transfer and gripping supports for moving molded articles from the mold station to the gripping station and from the gripping station to the conveying station.

13. The apparatus of claim 12 including a second guide rail extending from the gripping station to the mold station and cooperating with said first guide rail to receive bottom tails that are formed on said molded articles.

14. The apparatus of claim 1 wherein said cutting unit includes a top detabber for removing excess material from the top of molded articles and a bottom detabber for removing bottom tails that are formed on molded articles.

15. The apparatus of claim 14 wherein said top and bottom detabbers are mounted on a common rotary shaft.

16. A trim apparatus for use with a blow molding machine having a row of partible molds for forming plastic articles having a bottom tail and excess top material, the parting line of the molds defining a vertical parting plane, the combination comprising:
   a. a set of transfer supports corresponding in number to the number of molds in the row for receiving molded articles from said molds, said transfer supports being positioned below said molds and movable in a first horizontal path parallel to the parting plane from a mold station where the transfer supports are in vertical alignment with the row of molds to a gripping station and in a return path from said gripping station to said mold station;
   b. a set of gripping supports corresponding in number to the number of molds in said row for positively gripping molded articles delivered to said gripping station by said transfer supports upon return of said transfer supports to said mold station, said gripping supports being movable in a second horizontal path parallel to the parting plane from the gripping station to a conveying station and in a return path from said conveying station to said gripping station;
c. cutting means positioned in said second path for simultaneously removing the tails and excess top material from molded articles as they move from said gripping station to said conveying station, said cutting means comprising a top rotary detabber for removing the excess top material and a bottom rotary detabber for removing the tails;
d. means for simultaneously moving said transfer supports from said mold station to said gripping station and said gripping supports from said gripping station to said conveying station, and for simultaneously returning said transfer supports from said gripping station to said mold station and said gripping supports from said conveying station to said gripping station;
e. means for moving said transfer supports to release molded articles at said gripping station and for moving the transfer supports to vertical alignment with the molds at the mold station to receive molded articles at the mold station; and
f. means for moving said gripping supports to release molded articles at said conveying station simultaneously with the moving of the transfer supports to release molded articles at the gripping station, and for moving said gripping supports to grip said molded articles delivered to said gripping station by said transfer supports simultaneously with the moving of the transfer supports to vertical alignment with the molds at the mold station.

* * * * *